May 15, 1923.
A. C. ROEBUCK
1,455,095
FIRE DOOR OPERATING MECHANISM
Filed Nov. 4, 1920     3 Sheets-Sheet 1
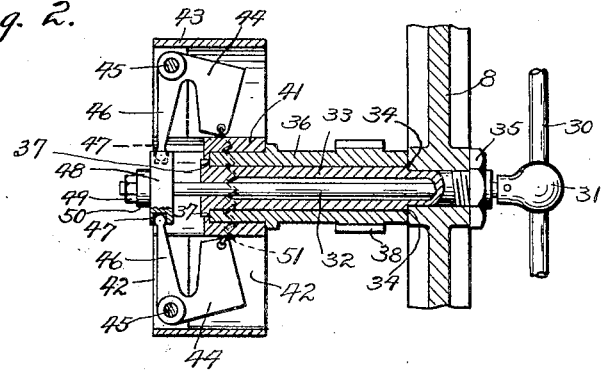
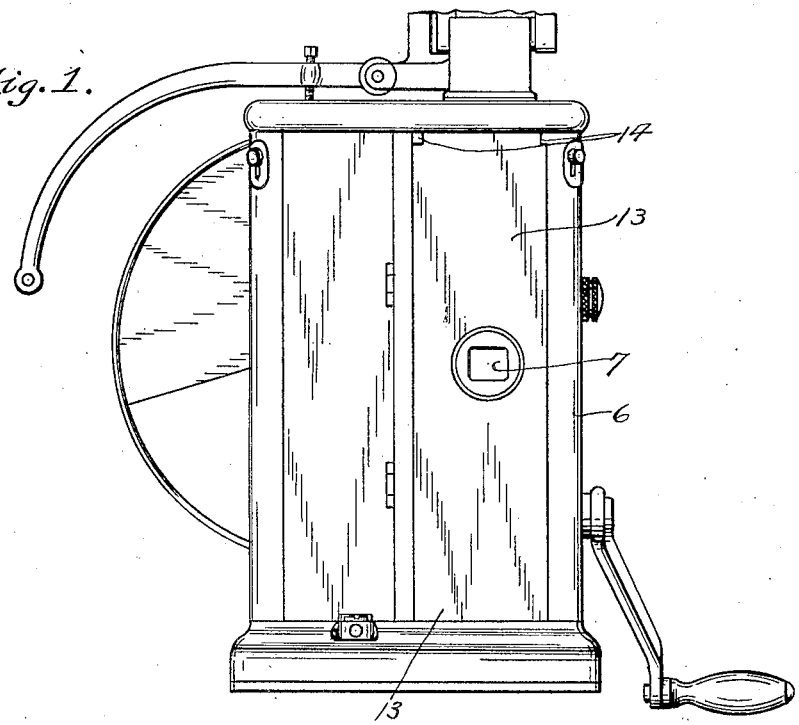
Inventor,
Alvah C. Roebuck
By Nissen & Crane
Attys.

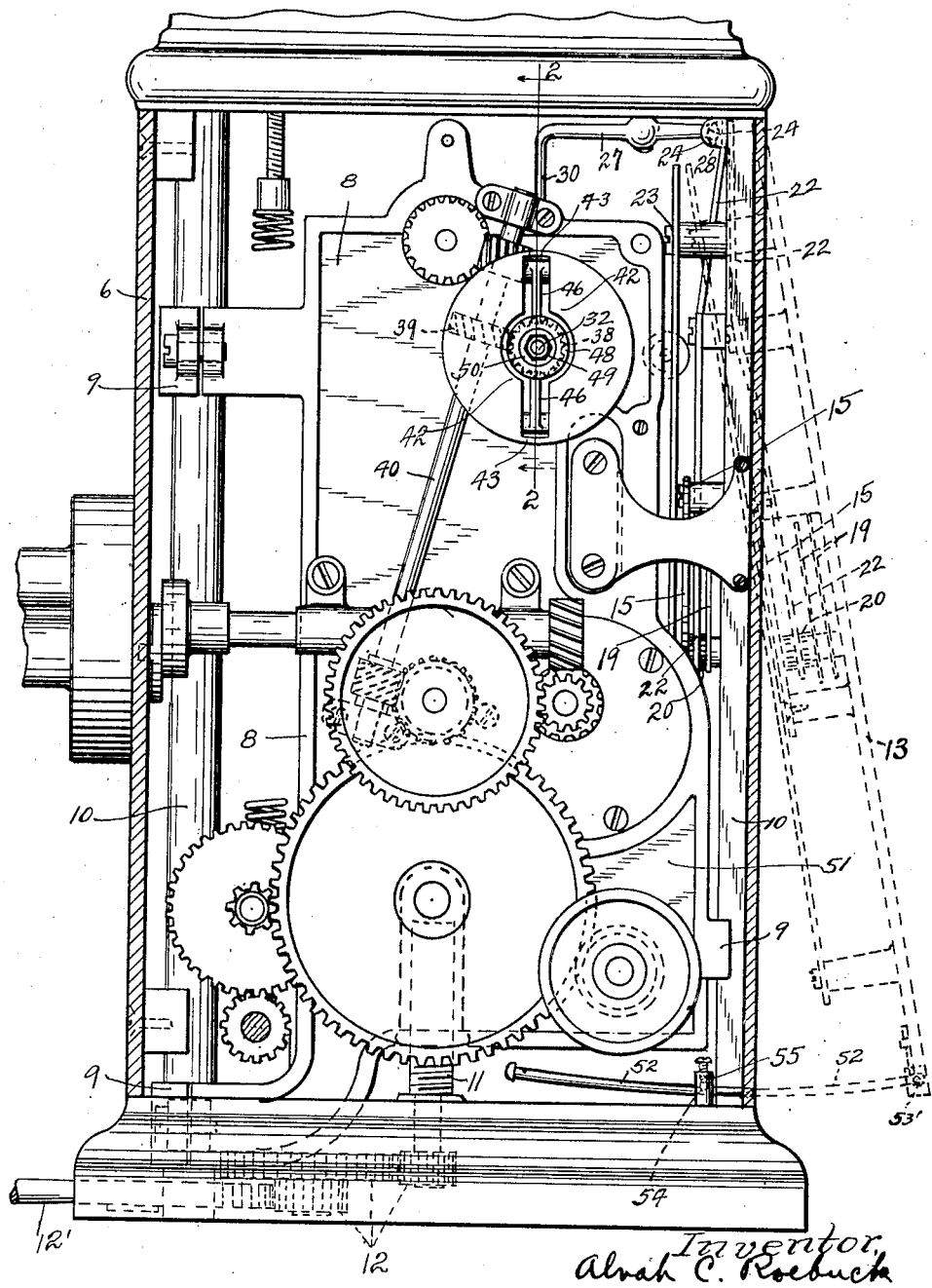

May 15, 1923.
A. C. ROEBUCK
1,455,095
FIRE DOOR OPERATING MECHANISM
Filed Nov. 4, 1920 3 Sheets-Sheet 3
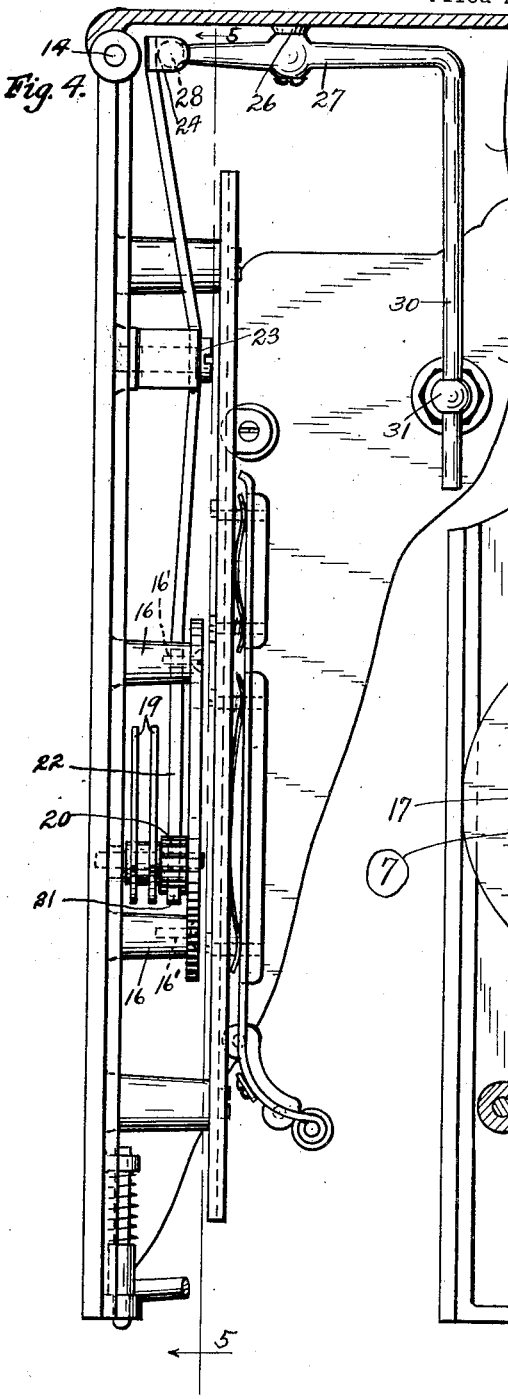
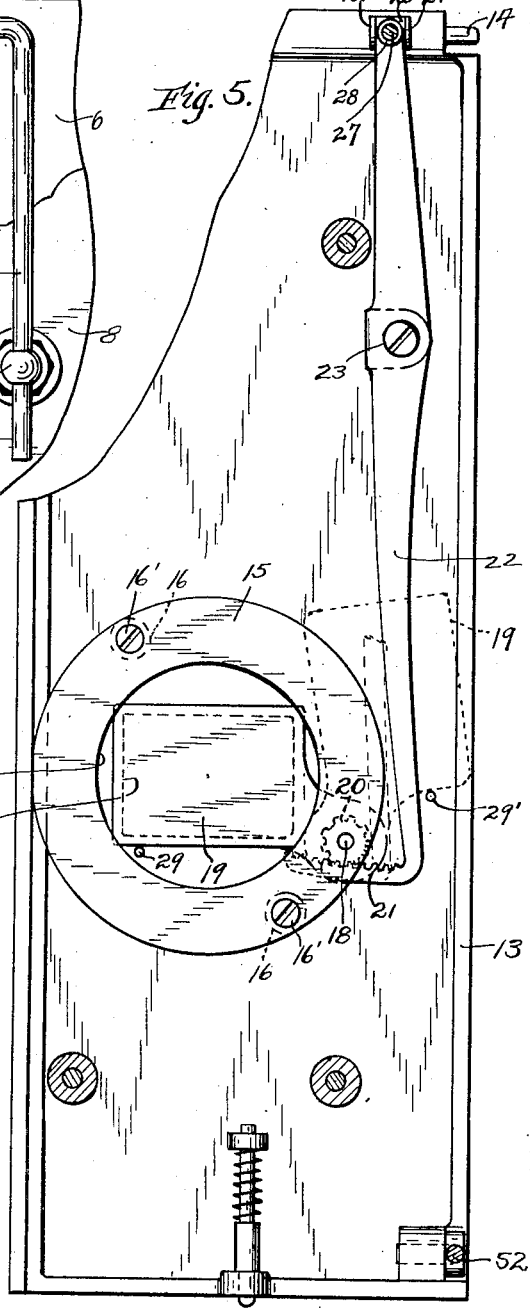

Patented May 15, 1923.

1,455,095

UNITED STATES PATENT OFFICE.

ALVAH C. ROEBUCK, OF CHICAGO, ILLINOIS.

FIRE-DOOR-OPERATING MECHANISM.

Application filed November 4, 1920. Serial No. 421,784.

*To all whom it may concern:*

Be it known that I, ALVAH C. ROEBUCK, a citizen of the United States, residing at Chicago, in the county of Cook and State of Illinois, have invented certain new and useful Improvements in Fire-Door-Operating Mechanism, of which the following is a specification.

My invention relates to motion picture mechanism, and more particularly to mechanism for automatically opening and closing a fire door of motion picture devices.

One object of my invention is the provision of a simple and efficient means for automatically opening and closing the fire door of a motion picture apparatus.

A further object is the provision of a simple and efficient fire shutter and operating means therefor adapted to permit opening and closing the film gate of motion picture apparatus sufficiently to permit threading or inspecting a film in such mechanism without disconnecting or cramping the operating mechanism of the fire shutter.

Other objects will appear hereinafter.

An embodiment of my invention is illustrated in the accompanying drawings, forming a part of this specification, and in which—

Fig. 1 is a rear elevation of a motion picture mechanism casing;

Fig. 2 is an enlarged section of the governor apparatus used in my improvement;

Fig. 3 is a side view of a motion picture mechanism with one side of the casing removed to expose internal parts, such mechanism embodying my invention;

Fig. 4 is an enlarged fragmental section showing parts of my improved device; and Fig. 5 is a section taken on line 5—5 of Fig. 4.

Referring more particularly to the drawings, I have indicated a casing 6 for enclosing motion picture mechanism. This casing may be of any desired or approved construction. Such a casing has a light opening 7 into which light is directed to the film-operating mechanism and lens.

The film operating mechanism shown is intended to represent any desired or preferred construction. In such mechanism the film-moving parts are usually mounted for limited vertical movement and the light passage and lens having its axis fixed. The film-moving parts are mounted so as to move vertically to bring a single complete picture of the film opposite the opening 7. In the device illustrated, a frame 8 has portions 9 engaging guides 10 in the casing with a screw 11 threaded in the frame and journaled in the bottom of the casing, as clearly indicated in Fig. 3. The screw 11 may be operated through a train of gears 12 by a hand lever 12', as indicated, or the frame 8 may be raised and lowered in any other desirable manner.

The casing 6 is provided with a door 13 which has the opening 7 therein. I preferably mount the door 13 on a horizontal hinge 14 at its top so that it may be opened to move the parts mounted thereon away from other parts within the casing to permit threading a film in the device or for inspecting the interior of the device.

A plate 15 is mounted on lugs 16 on the door 13 and held by screws 16' or in any other desirable manner. An opening 17 is formed in plate 15 in registration with opening 7. A shaft 18 is journaled in the plate 15 and door 13, there being a fire door 19 fixed on the shaft 18. In the present instance I have indicated two spaced doors 19 and it will be understood that one or more of these doors may be used, as desired.

Also, fixed on shaft 18 is a pinion 20 which meshes with gear teeth on an angular arm 21 of a lever 22 which latter is pivoted to door 13 as at 23 in any approved manner. The upper end of lever 22 extends to a point near the hinge 14 of door 13 and has two arms 24 disposed at an angle to the side of said lever providing a slot. The upper portion of casing 6 has a depending stud 26 to which is pivoted a lever 27, and said lever 27 has a ball 28 at one end disposed in the slot 25 of lever 22 so that the swinging of lever 27 will swing lever 22 and consequently open and close door 19. A pin 29 is indicated below opening 7 to limit the movement of door 19 in one direction and define its position when closed. A pin 29' on door 13 is provided to limit the door at its other terminal movement and limit its opening position, see Fig. 5.

By disposing the ends of levers 27 and 22 adjacent the hinge 14 of the door and providing the ball and slot connection between said levers, the door can be opened and closed a sufficient distance to permit threading or inspecting a film without disconnecting the ball 28 from slot 25 or in any way cramping any of the parts of the device.

Furthermore, if it is desired to take the door 13 entirely off its hinge the latter can be withdrawn and the door removed, thereby disengaging the arms 24 from the ball 28. When the door is put back in position the arms 24 will automatically engage the ball 28 to connect the levers.

The lever 27 has an angular arm 30 thereon extending substantially parallel to the axis of said lever and in the general direction of movement of said frame 8. The arm 30 is slidably mounted in an opening in an enlargement 31 of a governor rod 32, and the latter is slidably mounted for longitudinal movement in a hollow member 33, see Fig. 2. Said member 33 has a restricted portion extending through a suitable opening in frame 8, see Fig. 2, with a shoulder 34 engaging one side of said frame and a nut 35 threaded on said restricted portion against the other side of said frame holding said member rigidly.

A hollow shaft 36 is journaled on the outside of member 33 and held against longitudinal movements thereon by having one end engaging frame 8 and its other end engaging an enlargement or shoulder 37 on member 33. The shaft 36 has a pinion 38 thereon driven from a gear 39 on a shaft 40, and the latter is connected with the train of gears operating the film-moving parts of the device, as clearly indicated in Fig. 3.

Fixed on the shaft 36 is a hub 41, see Fig. 2, having portions 42 which extend outwardly with a tubular shell or casing 43 substantially concentric with said hub. I have indicated two parts 42 between which are two pivoted weight members 44, pivoted as at 45. Each member 44 has an arm 46 which extends toward rod 32 and engages a suitable recess 47 in a head 48, and the latter is rotatably mounted on said rod 32. A nut 49 and a washer 50 hold the head 48 in position on the rod 32. I preferably make the recesses 47 in sizes just large enough to loosely take the rounded ends of arms 46 so that said arms will cause head 48 to rotate with shaft 36. Where the head 48 rotates with the arms 46 only a slight friction between the head and rod will be had as compared with the amount of friction in ordinary governors which have peripheral grooves in their heads corresponding to my head 48 when such heads are fixed on the governor rods and the arms 46 extend into the grooves.

The parts of the device in Fig. 2 are shown when the mechanism is at rest and the door 19 is closed or over opening 17, as indicated in Fig. 5. When the film-moving parts are placed in operation and the speed of shaft 36 is brought to a predetermined number of revolutions per minute the weights 44 will have been swung by centrifugal force sufficiently to cause arms 46 to move governor rod 32 longitudinally in member 33, and this movement of the governor rod swings levers 27 and 22 on their axes, and the latter through its gear teeth on arm 21 operating on pinion 18 moves the fire door 19 to its open position or away from opening 17, as indicated in Fig. 5. The fire door is held, by centrifugal force in weights 44 and the connecting mechanism, in its open position as long as the film-moving parts operate at or above a predetermined speed, but upon the film-moving parts falling below this predetermined speed the spring 51 will draw weights 44 back toward each other and consequently move the fire door from its open to closed position, as shown in Fig. 5.

It will be apparent with this construction that the connection between the levers 27 and 22 is such that the film gate carrying the fire door may be opened and closed freely for the threading or inspection of a film without in any way cramping or straining the connection between the governor and the fire door. Furthermore, if it is desirable to entirely remove door 13 it can be done without injury or straining the connection between said fire door and its operating governor. In Fig. 3 I have indicated the door 13 and parts mounted thereon in dotted lines in their positions for threading or inspecting a film. It will be noted that the levers 27 and 22 are still in operative condition. The door 13 may be held in this position by a rod 52 pivoted as at 53' to door 13 and held by a spring-pressed member 54 in a lug 55 on the casing.

I claim:

1. Motion picture apparatus comprising a casing having top and side walls with a door opening in one side wall; a casing door in said door opening hinged at its top at the top of said door opening; a fire door pivoted on the casing door; a lever connected to the fire door and pivoted on the casing door with one end close to the hinge of the latter; and a lever pivoted to the top wall with one end disposed at substantially right angles and close to the adjacent end of the other lever, one of said levers having a slot engaging the adjacent end of the other lever.

2. Motion picture apparatus comprising a casing having a light opening therein; a perforated plate spaced from said casing; a shaft journaled in said plate and casing; a fire door fixed on said shaft; a pinion on said shaft; a lever pivoted to the casing and having an angular arm thereon; gear teeth on said arm meshing with said pinion; and a governor connected with said lever.

3. Motion picture apparatus comprising a casing having a light opening therein; a fire door mounted adjacent the light opening; a lever pivoted to the casing and connected with said fire door; a second lever pivoted to said casing and having a yieldable connection with the first-mentioned lever; and a governor actuated member having a sliding engagement with a portion of said second-mentioned lever.

4. Motion picture apparatus comprising a casing; a lever pivoted to said casing; a governor actuated rod mounted in the casing for movement toward and away from said lever and having a sliding connection with said lever; and a fire door connected with said lever.

5. Motion picture apparatus comprising a casing; a governor mounted for vertical movement in said casing; a lever mounted above said governor and having a portion extending in the direction of travel of said governor and operatively connected with the latter; and a fire door mounted on the casing and connected with said lever.

6. Motion picture apparatus comprising a casing having vertical guides therein; a frame mounted on said guides; a governor actuated rod mounted on the frame for movement transversely of the movement of said frame; a lever pivoted on a vertical axis and having a portion extending vertically and engaging said governor actuated rod; and a fire door pivoted on said casing and connected with said lever.

7. Motion picture apparatus comprising a casing; a frame mounted for vertical movement in said casing; a governor mounted at one side of said frame and having an actuating rod extending through said frame; a lever pivoted to the casing above said frame and having a portion extending vertically and engaging said governor actuating rod; and a fire door connected with said lever.

8. Motion picture apparatus comprising a housing; a film gate door pivoted to the housing; a lever pivoted on said door; a lever pivoted on said housing on an axis at right angles to the axis of the lever on said door, there being one end of one of said levers extending into a slot in an end portion of the other lever permitting limited swinging of said door without disconnecting said levers; and a fire door operatively connected with the second-mentioned lever.

9. Motion picture apparatus comprising a housing; a film gate door pivoted to the housing; a lever pivoted on said door; a lever pivoted on said housing on an axis at right angles to the axis of the lever on said door; two arms on one of said levers extending toward and engaging an end of the other lever; and a fire door operatively connected to one of said levers.

10. Motion picture apparatus comprising a housing; a film gate door pivoted to the housing; a lever pivoted on said door; a lever pivoted on said housing on an axis at right angles to the axis of the lever on said door; two arms on one of said levers extending toward and engaging an end of the other lever; a fire door operatively connected to one of said levers; and a stop limiting the swinging of said film gate door in open position.

11. Motion picture apparatus comprising a housing; a film gate door pivoted to the housing; a lever pivoted to said door with one end adjacent the hinge of the latter; a lever pivoted to the top of the housing; arms on the first-mentioned lever engaging an end of the second-mentioned lever; an angular portion on the second-mentioned lever disposed vertically; a governor mounted for vertical movement in said housing and slidably and operatively connected with the angular portion of said second-mentioned lever; and a fire door operatively connected with the first-mentioned lever.

12. Motion picture apparatus comprising a housing; a film gate door pivoted to the housing; a frame mounted for vertical movement in said housing; a governor mounted on the frame; a lever pivoted to the housing and having a portion disposed vertically and operatively engaging said governor; a lever pivoted on the door; arms on one of said levers forming a slot engaging an end of the other lever; and a fire door pivoted on the film gate door and operatively connected with the second-mentioned lever.

13. Motion picture apparatus comprising a housing; a governor operated lever pivoted on the housing; a film gate door pivoted to the housing on a horizontal pivot at the top of said door; a lever pivoted on said door with one end adjacent an end of the first-mentioned lever and the hinge of said door, there being a slot in the end of one of said levers engaging an end of the other lever; and a fire door on the film gate door operatively connected with the second-mentioned lever.

14. Motion picture apparatus comprising a housing; a film gate door hinged at one of its edges to said housing; two levers, one being pivoted to the film gate and the other being pivoted to the housing and each lever having an end disposed close to the hinge of the film gate door; a slot in one end of one of the levers engaging the adjacent end of the other lever, the film gate door being adapted to swing on its hinge without disconnecting said lever from said slot; a fire door on the film gate door connected with one of said levers; and a governor actuated rod in the housing connected with the other lever.

In testimony whereof I have signed my name to this specification on this 23rd day of October A. D. 1920.

ALVAH C. ROEBUCK.